United States Patent [19]
Matsuzono

[11] Patent Number: 5,822,158
[45] Date of Patent: Oct. 13, 1998

[54] GIANT MAGNETORESISTANCE EFFECT DEVICE WITH MAGNETICALLY SENSITIVE PORTION OF A SIZE LARGE THAN PLAYBACK TRACK WIDTH

[75] Inventor: Atsushi Matsuzono, Miyagi, Japan

[73] Assignee: Sony Corporation, Tokyo, Japan

[21] Appl. No.: 824,307

[22] Filed: Mar. 26, 1997

[30] Foreign Application Priority Data

Mar. 29, 1996 [JP] Japan .................................. 8-077972

[51] Int. Cl.⁶ ...................................................... G11B 5/39
[52] U.S. Cl. ............................................................ 360/113
[58] Field of Search ............................................. 360/113

[56] References Cited

U.S. PATENT DOCUMENTS

5,698,335  12/1997  Iwasaki .................................. 360/113

Primary Examiner—A. J. Heinz
Attorney, Agent, or Firm—Hill & Simpson

[57] ABSTRACT

A longitudinal type magnetoresistance effect device employed in a thin-film magnetic head enclosed within a high-density magnetic recording device or in a high-sensitivity magnetic sensor, in which the rate of change in resistance dependent on the sense current density may be prevented from being lowered and in which high magnetic field sensitivity may be realized even in the high sense current density area. The sense current flows in the device in a direction at right angles to the plane of the magnetic recording medium. At least two or more layers of the soft magnetic layers and the non-magnetic electrically conductive layers are stacked in multiple layers and has a broad width portion in an area which proves to be a current route for the sense current.

9 Claims, 8 Drawing Sheets

GIANT MAGNETORESISTANCE EFFECT DEVICE WITH MAGNETICALLY SENSITIVE PORTION OF A SIZE LARGE THAN PLAYBACK TRACK WIDTH

BACKGROUND OF THE INVENTION

1. Field of the Invention

This invention relates to a giant magnetoresistance effect device employed in a thin-film magnetic head enclosed within a high-density magnetic recording device or in a high-sensitivity magnetic sensor.

2. Description of the Related Art

For raising the surface recording density of a magnetic storage device, such as a hard disc drive, a thin-film magnetic head employing a magnetoresistance effect device exhibiting high magnetic field sensitivity is being put to practical use and its validity has also been recognized.

The magnetoresistance effect device currently put to practical use is based on an effect known as the anisotropic magnetoresistance effect and generally exhibits a resistance change rate on the order of 2%. On the other hand, a device exhibiting a resistance change rate of not less than 5% based on a totally different principle known as the giant magnetoresistance effect has also been proposed in various configurations.

Researches are conducted briskly towards realizing a thin-film magnetic head having a magnetic field sensitivity higher than that obtained with the use of the device employing the anisotropic magnetoresistance effect using a device exploiting this giant magnetoresistance effect (GMR device).

The giant magnetoresistance effect is generated by changes in the angle between spins which stand for the magnetic moment between different magnetic layers spaced a moderate distance from each other by a non-magnetic electrically conductive layers, formed of, for example, Cu or Ag. The amount of change in resistance is proportionate to $\cos\theta$ where $\theta$ is an angle between spins. Thus, for realizing the gant magnetoresistance effect, it is necessary for the spins of neighboring magnetic layers to have different motion with respect to an external magnetic field to produce changes in the angle.

The film structure of an MR device is roughly divided, in association with the mechanism of generating angular changes between neighboring spins, into three sorts, namely a coupling type multi-layer film, an induction ferri type multi-layer film and a spin bulb film.

In the coupling type multi-layer film, the magnetic layers are arrayed antiferromagnetically by setting the exchange coupling force between magnetic layers to negative values. Therefore, with the coupling type multi-layer film, the directions of spins of neighboring magnetic layers are alternately reversed, that is set to 180° opposite to each other.

In the induction ferri type multi-layer film, hard magnetic layers and soft magnetic layers are layered alternately. With the induction ferri type multi-layer film, only the soft magnetic layer is in a state of responding to the external magnetic field.

In the spin bulb film, two soft magnetic layers are arranged with a non-magnetic electrically conductive layer in-between. In the spin bulb film, only one of the hard magnetic layer and the soft magnetic layer pinned to the other magnetic layer by the exchange bias magnetic field of the antiferromagnetic layer is in the state of responding to the external magnetic field using the other of the magnetic layers.

With the coupling type multi-layer film and the induction ferri type multi-layer film, a larger rate of resistance change of not higher than 10% can be obtained in a sheet form.

However, with the coupling type multi-layer and the induction ferri type multi-layered film, the orientations of neighboring spins are aligned by the magnetic fields generated by the sense current under the high current density in the device form, thus lowering the rate of change in resistance.

On the other hand, the spin bulb film exhibits the rate of change in resistance of not larger than 4% in a sheet form which is smaller than that of the coupling type multi-layer film or the induction ferri type multi-layer film.

However, since the spin bulb film has only one magnetic layer responding to the external magnetic field, referred to hereinafter as a free layer, it is possible to maintain a suitable bias point, namely a state in which the spin of the fixed layer is perpendicular to that of the free layer by canceling the counter-magnetic field from a layer with a fixed magnetization, referred to hereinafter as a fixed layer, and the current-magnetic field by the sense current (self-field). Consequently, the spin bulb film can be designed so that self-bias will also be applied without lowering the rate of resistance change even under high current density conditions.

By the above reason, tentative researches are currently conducted on the device level. Only the spin bulb film presumably can be put to practical use. As for the coupling type multi-layer film and the induction ferri type multi-layer film, no reports have been made on the possible use of these multi-layer films.

The spin bulb films of other types than those described above have been tentatively produced and publicized to date. These spin bulb versions are the so-called transverse magnetoresistance effect device in which the sense current is caused to flow in a parallel direction on the plane of the recording medium.

On the other hand, as for a magnetoresistance effect type head exploiting the anisotropic magnetoresistance effect, researches are currently conducted for a so-called longitudinal MR device in which the sense current is caused to flow substantially in the orthogonal direction relative to the plane of the magnetic recording medium.

In the longitudinal MR device, in distinction from the transverse type magnetoresistance effect device, since the output remains constant if the track width is reduced under a constant current density condition, a higher output can be advantageously realized in case of reducing the track width than is possible with the transverse type magnetoresistance effect device.

The longitudinal MR device also has a merit that, since all of the electrically conductive members arranged on an air bearing surface (ABS), that is a surface facing the recording medium, can be brought to the same electrical potential, the device is strong against electrostatic destruction.

The longitudinal MR device has an additional merit that, since it is stabilized in the direction of easy axis by the magnetic field proper to the sense current, there is no necessity of providing a magnetic domain stabilizing film.

Since a higher rate of change of resistance can be used for the coupling type multi-layer film and the induction ferri type multilayer film, as described above, while the saturation magnetic field can be set to a smaller value, it becomes possible to increase the sensitivity to a magnetic field in a sheet form.

However, with the coupling type multi-layer film and the induction ferri type multilayer film, since the rate of resistance change is lowered if the multilayer film is used in the form of a device in a high current density area, sensitivity to the magnetic field is lowered.

The reason this drawback is incurred is that the direction of a neighboring spin is substantially parallel under the effect of a self-field generated by the sense current, while the angular orientation to which respond the two neighboring spins becomes substantially the same, so that an angular change between the two neighboring spins become small.

SUMMARY OF THE INVENTION

It is therefore an object of the present invention to provide a giant magnetoresistance effect device whereby the rate of change of resistance dependent on the sense current density may be prohibited and a high magnetic field sensitivity can be realized even in a high sense current density.

According to the present invention, there is provided a giant magnetoresistance effect device in which the sense current flows in a direction perpendicular to a surface of a magnetic recording medium. At least two or more layers of soft magnetic layers and non-magnetic electrically conductive layers are layered together in multiple layers. There is a broad width area in a region which becomes a current route for the sense current.

In the giant magnetoresistance effect device according to the present invention, the sense current flows in an area of the current route and in the broad width area. In the giant magnetoresistance effect device, the sense current flowing in the broad width area is lowered in density so that the current magnetic field produced by the sense current is diminished. Thus, with the giant magnetoresistance effect device, neighboring spins of the magnetic layers disposed in the broad width area cannot be alined in parallel without difficulties, so that the spins of the magnetic layers disposed in the broad width area are held in the antiferromagnetic disposition.

With the present giant magnetoresistance effect device, the magnetic layers disposed in the broad width area are ferromagnetically coupled to one another in an in-plane relation with the magnetic layers disposed in areas excluding the broad width area of the current route. Thus, with the present giant magnetoresistance effect device, the spins of the magnetic layers disposed in the area of the current route are maintained in the antiferromagnetic disposition under the effect of the spins of the magnetic layers disposed in the broad width area and which are maintained in the antiferromagnetic disposition.

Another giant magnetoresistance effect device according to the present invention, which is a longitudinal type magnetoresistance effect device in which the sense current flows in a direction at right angles with the plane of the magnetic recording medium, includes a device member having a multi-layer structure made up of many layers of soft magnetic layers and non-magnetic electrically conductive layers and an electrically conductive member contacted with an area operating as a current route for the sense current of the device member. The electrically conductive member is broader in width than the area which becomes the current route for the sense current of the device member.

With the above-described giant magnetoresistance effect device according to the present invention, the sense current flows in the device member and in the electrically conductive member. Since the sense current flowing in the area connected to the electrically conductive member in the device member is lowered in current density, the current magnetic field produced by the sense current is diminished. This renders it difficult to effect parallel alignment of the neighboring spins of the magnetic layers positioned in the area of the device member connected to the electrically conductive member. The result is that, in the giant magnetoresistance effect device, the spins of the magnetic layers positioned in the area of the device member connected to the electrically conductive member are maintained in the antiferromagnetic disposition.

With the present giant magnetoresistance effect device, the magnetic layers positioned in the area of the device member connected to the electrically conductive member are ferromagnetically coupled in the in-plane relation with the magnetic layers positioned in the areas of the device member other than the area thereof connected to the electrically conductive member. Thus, with the giant magnetoresistance effect device, the spins of the magnetic layers positioned in the area of the device member other than the area thereof connected to the electrically conductive member are maintained in the antiferromagnetic disposition under the effect of the spins of the respective magnetic layers positioned in the area of the device member connected to the electrically conductive member and thereby held in the antiferromagnetic disposition.

With the giant magnetoresistance effect device according to the present invention, since the spin of each magnetic layer disposed in the area of the current route is maintained in the antiferromagnetic disposition, the antiferromagnetic coupling between the magnetic layers can be prevented from being destroyed.

Also, with the present giant magnetoresistance effect device, the broad width area lowers the density of the sense current flowing in the area of the current route for preventing the heat evolution due to the sense current. Moreover, since the heat radiation effect occurs from the broad width area, the antiferromagnetic coupling between the magnetic layers positioned in the area of the current route can be prevented from being destroyed.

Therefore, in the area of the current route, the rate of changes in resistance dependent on the sense current density may be prevented from being lowered, thus realizing high magnetic field sensitivity.

In addition, since the spins of the magnetic layers in the device member are maintained in the antiferromagnetic disposition, the antiferromagnetic coupling between the magnetic layers can be prevented from being destroyed.

Furthermore, the electrically conductive member lowers the density of the sense current flowing in the device member to prevent heat evolution due to the sense current. Since the heat evolution effect is produced by the electrically conductive member, the antiferromagnetic coupling between the magnetic layers in the device member can be prevented from being destroyed.

Thus, with the giant magnetoresistance effect device, the rate of change in resistance in the area of the device member dependent on the sense current density may be prevented from being lowered, thus realizing high magnetic field sensitivity.

DESCRIPTION OF THE PREFERRED EMBODIMENTS

Figure 1:
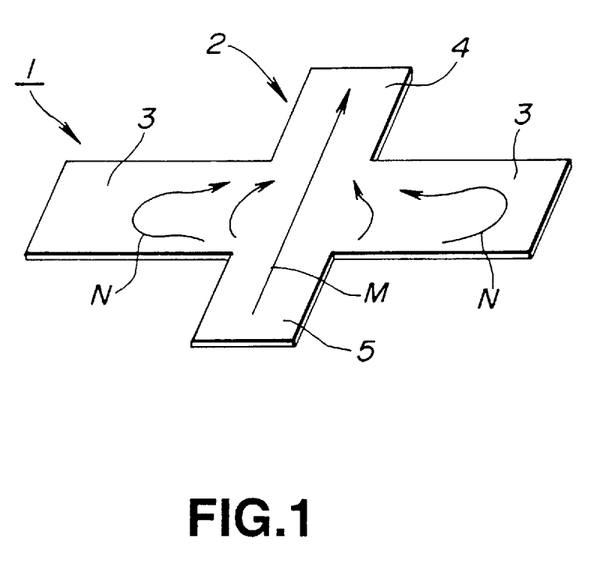
FIG. 1 is a perspective view showing a GMR device according to a first embodiment of the present invention.

Referring to FIGS. 1 through to 10, preferred embodiments of the present invention will be explained in detail. In a giant magnetoresistance effect device (GMR device) 1, shown as a first embodiment of the present invention, a forward end electrode a rear end electrode are arranged at a forward end 4 and a rear end 5, respectively, for the sense current to flow through in practical utilization of the device. For realizing resolution in the direction of the line density, the GMR device 1 in its entirety is arranged in a gap defined between the upper and lower magnetic shields.

It is noted that the forward end is required to have a width smaller than the playback track width of the magnetic recording medium. The same holds for the second and third embodiments, although not explained specifically.

Referring to FIG. 1, a GMR device 1 shown as a first embodiment of the present invention is comprised of a multilayered structure made up of at least two or more of soft magnetic layers and non-magnetic electrically conductive layers, layered together, although the layered structure is not shown. The device 1 has a current routing portion 2 in the form of an elongated rectangle having a widened longitudinal mid portion. The current routing portion 2 and the widened portion 3 are formed by etching to a desired shape. The sense current is caused to flow along the length of the current routing portion 2 by a forward end electrode and a rear end electrode connected to the forward end 4 and to the rear end 5, respectively.

The widened portion 3 is a transversely extended in rectangular shape as one with and at right angles with the current routing portion 2, and has a width larger than the playback track width of the magnetic recording medium. This holds for the second and third embodiments, although not explained specifically. The widened portion 3 has a thickness substantially equal to the thickness of the current routing portion 2 and a width larger than the width of the current routing portion 2. Also, the widened portion 3 has a length smaller than the length of the current routing portion 2.

With the above-described first embodiment of the GMR device 1, the sense current flows, by the forward electrode and the rear end electrode, from the rear end 5 towards the forward end 4 of the current routing portion 2 in a direction indicated by arrow M in FIG. 1. In addition, the sense current flows in the widened portion 3, as indicated by arrow N in FIG. 1. At this time, since the sense current flowing in the widened portion 3 of the current routing portion 2 is lowered in density, the current-magnetic field (self-field) produced by the sense current is diminished. Thus, with the GMR device 1, neighboring spins of magnetic layers disposed in the widened portion 3 of the current routing portion 2 cannot be aligned in substantially parallel directions without difficulties. Consequently, with the present GMR device 1, the spins of the magnetic layers disposed in the widened portion 3 of the current routing portion 2 are maintained in the antiferromagnetic spin condition.

On the other hand, if the widened portion 3 is increased sufficiently in width, difficulties in effecting substantially parallel alignment of the neighboring spins of the magnetic layers disposed at both ends of the widened portion are accentuated, so that the spins of the magnetic layers disposed at both ends of the widened portion 3 are maintained in the antiferromagnetic spin condition.

With the present GMR device 1, the magnetic layers disposed in the widened portion 3 of the current routing portion 2 are ferromagnetically coupled in the in-plane condition with the respective magnetic layers disposed in the forward end 4 and the rear end 5 of the current routing portion 2. Thus, with the present GMR device 1, the spins of the magnetic layers disposed at the forward end 4 and the rear end 5 of the current routing portion 2 are maintained in the antiferromagnetic spin condition under the effect of the spin of each magnetic layer disposed in the widened portion 3 and hence maintained in the antiferromagnetic spin condition.

With the present GMR device, if the forward electrode and the rear electrode are connected to the forward and 4 and the rear end 5 of the current routing portion 2, respectively, the sense current flowing in an area of connection of the electrodes of the forward end 4 and the rear end 5 of the current routing portion 2 is lowered in density. Thus, in an area of connection to the electrodes of the forward end 4 and the rear end 5 of the current routing portion 2, the current-magnetic field caused by the sense current is diminished. Thus, with the present GMR device 1, the spins of each magnetic layer disposed in the area of connection to the electrodes of the forward end 4 and the rear end 5 are maintained in the antiferromagnetic spin condition.

Thus, in the above-described first embodiment of the GMR device 1, since the spin of each magnetic layer disposed in the current routing portion 2 is maintained in the antiferromagnetic spin condition, the antiferromagnetic coupling between the magnetic layers may be prevented from being destroyed.

Also, with the present GMR device 1, the widened portion 3 of the current routing portion 2 lowers the density of the sense current flowing in the current routing portion 2 to prevent the heat from being evolved by the sense current. Moreover, the antiferromagnetic coupling between the magnetic layers in the current routing portion 2 may be prevented from being destroyed.

Thus, with the present GMR device 1, the rate of change in resistance dependent on the sense current density may be prevented from being lowered in the magnetically sensitive portion defined between the forward portion 4 and the rear portion 5 in the current routing portion 2 thus achieving high magnetic field sensitivity.

Figure 2:
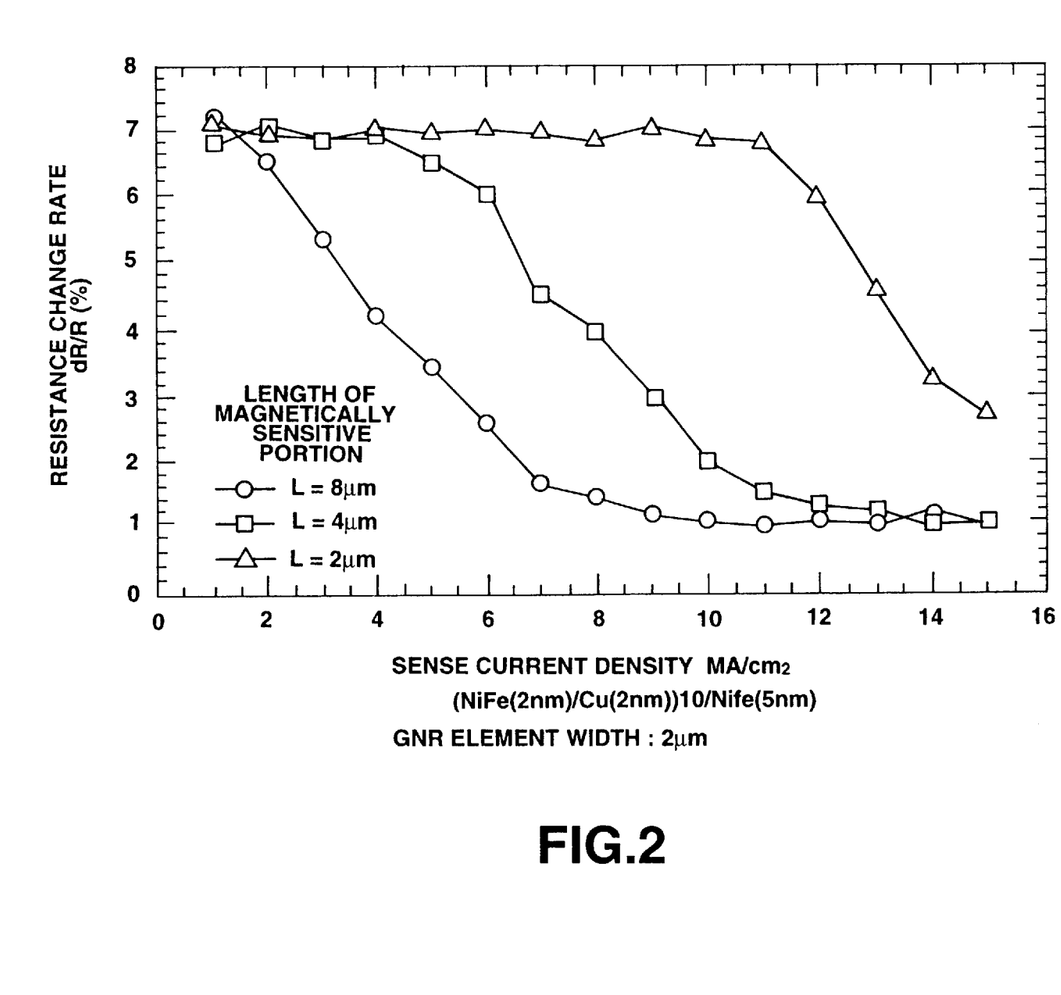
FIG. 2 is a graph showing the rate of change in resistance relative to the sense current density in each magnetically sensitive length portion.

In particular, in the present GMR device 1, if the magnetically sensitive portion has a length in a range of from not less than 0 $\mu$mm to not larger than 2 $\mu$m, it is possible to prevent the rate of change in resistance from being lowered in a range of the sense current density of not destroying the antiferromagnetic coupling between the magnetic layers, as shown in FIG. 2. The length of the magnetically sensitive portion means a length between connection holes in the current routing portion 2 connected to the forward electrode and the rear electrode.

Figure 3:
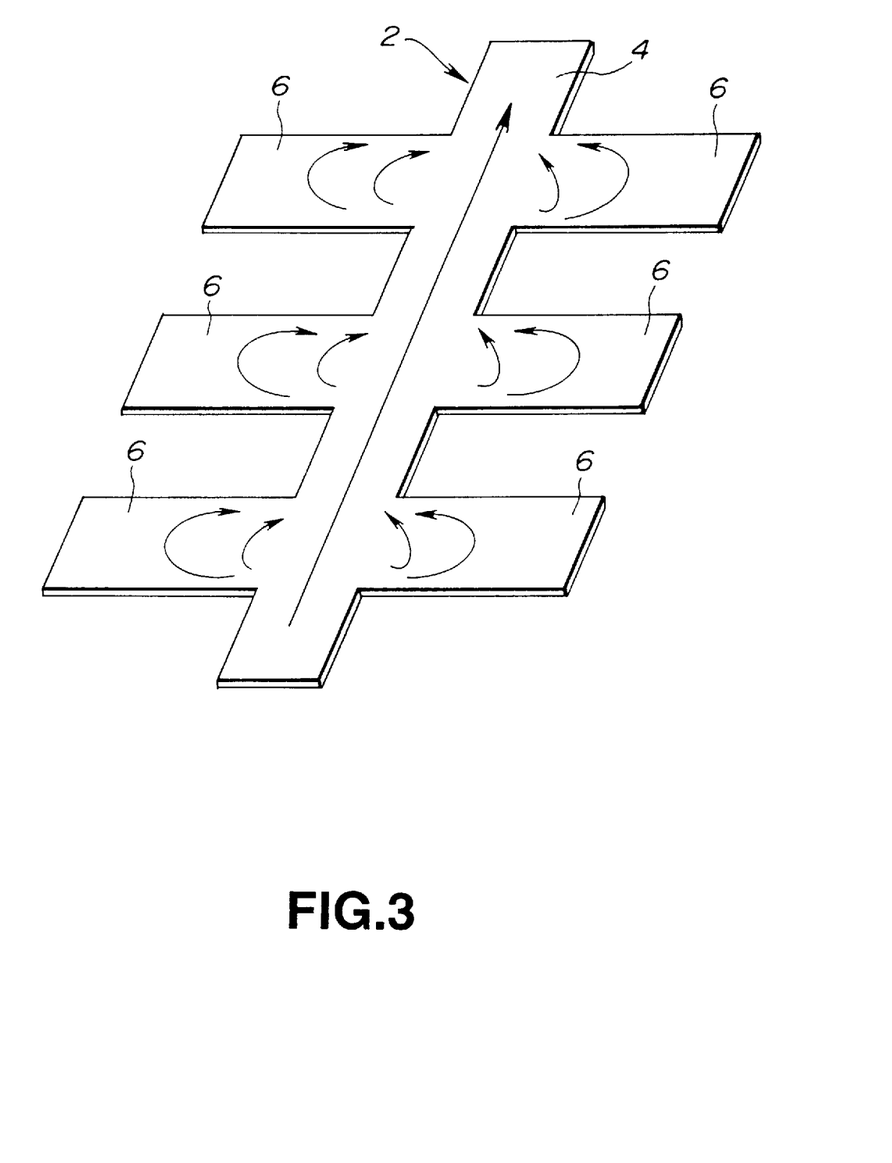
FIG. 3 is a perspective view showing a modification of the GMR device shown in FIG. 1.

In the first embodiment of the GMR device 1, a portion of the longitudinally mid area of the current routing portion 2 is formed as a widened portion 3. However, a plurality of widened portion 6 may also be provided in the current routing portion 2, depending on the length of the magnetically sensitive portion, as shown in FIG. 3.

Figure 4:
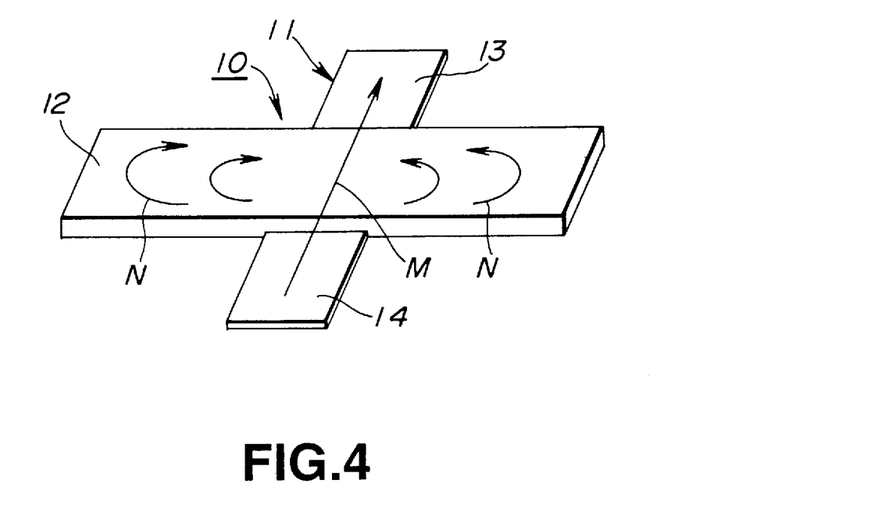
FIG. 4 is a perspective view showing a GMR device according to a second embodiment of the present invention.

A GMR device 10 according to a second embodiment includes an elongated rectangular-shaped device member 11 and a transversely extending rectangular electrically conductive member 12 formed on the device member 11. The device member 11 and the electrically conductive member 12 are etched to pre-set shape.

The device member 11 is comprised of a multilayer structure of at least two layers of soft magnetic layers and non-magnetic electrically conductive layers, although not shown. The sense current flows along the length of the device member 11 by the forward end electrode and the rear end electrode connected to a forward end 13 and to a rear end 14 of the device member 11, respectively.

The electrically conductive member 12 is electrically connected to the device member in a perpendicular state thereto and has a thickness approximately ten times that of the device member 11. The electrically conductive member 12 has a thickness substantially equal to the thickness of the rear end electrode connected to the rear end 14 of the device member 11 and a width larger than the width of the device member 11. Also, the electrically conductive member 12 has a length smaller than the length of the device member 11.

In the above-described second embodiment of the GMR device 10, the sense current flows from the rear end 14 towards the forward end 13 of the device member 11, as shown by arrow M in FIG. 4, while the sense current also flows in the electrically conductive member 12 in a direction as indicated by arrow N in FIG. 4. Since the sense current flowing in an area connected to the electrically conductive member 12 in the device member 11 in the GMR device 10 is decreased at this time in density, the current-magnetic density caused by the sense current is reduced. Thus, in the GMR device 10, neighboring spins of the magnetic layers disposed in an area of the device memberll connected to the electrically conductive member 12 can be aligned in parallel relation only with difficulties. Therefore, in the GMR device 10, the spins of the magnetic layers positioned in the area of the device member 11 connected to the electrically conductive member 12 are maintained in the antiferromagnetic disposition.

In the present GMR device 10, the magnetic layers disposed in the area of the device member 11 connected to the electrically conductive member 12 are ferromagnetically coupled to the respective magnetic layers disposed in the forward end 13 and in the rear end 14 of the device member 11. Thus, with the present GMR device 10, the spins of the magnetic layers disposed at the forward end 13 and the rear end 14 of the device member 11 are maintained in the antiferromagnetic disposition under the effect of the spins of the magnetic layers positioned in the area of the device member 11 connected to the electrically conductive member 12 and which are maintained in the antiferromagnetic disposition.

Moreover, if, in the present GMR device 10, the forward end electrode and the rear end electrode are connected to the forward end 13 and in the rear end 14 of the device member 11, respectively, the sense current flowing in areas of the forward end 13 and in the rear end 14 of the device member 11 connected to the electrodes is lowered in current density. Thus, with the present GMR device 10, the spins of the magnetic layers disposed in the area of connection of the forward end 13 and in the rear end 14 to the electrodes are maintained in the antiferromagnetic disposition.

Thus, with the above-described second embodiment of the GMR device, in which the spins of the magnetic layers disposed in the device member 11 are maintained in the antiferromagnetic disposition, the antiferromagnetic coupling between the magnetic layers may be prevented from being destroyed.

Also, with the present GMR device, since the sense current flows through the electrically conductive member 12, the device member 11 displays the heat radiating effect. Moreover, the antiferromagnetic coupling between the magnetic layers disposed in the device member 11 may be prevented from being destroyed.

Therefore, with the present GMR device 10, the rate of change in resistance dependent on the sense current density may be prevented from being lowered in the magnetically sensitive portion which is an area between the forward end 13 and in the rear end 14 in the device member 11, thus realizing high magnetic field sensitivity.

Moreover, if, with the present GMR device 10, the magnetically sensitive portion of the device member 11 is short in length and is disposed in the vicinity of the forward end 13 and in the rear end 14 where the sense current is low in current density, it is possible to prevent the rate of change in resistance dependent on the sense current density from being lowered in the region of the magnetically sensitive portion, thus realizing a high magnetic field density even in a region of high sense current density.

Figure 5:
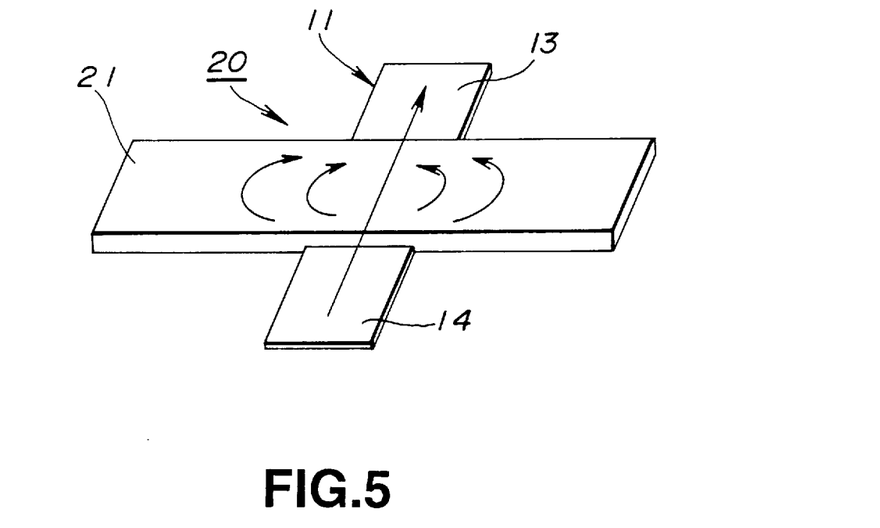
FIG. 5 is a perspective view showing a modification of the GMR device shown in FIG. 3.

In the second embodiment of the GMR device 10, the electrically conductive member 12 may be formed of a magnetic electrically conductive material, such as a soft magnetic electrically conductive material, in place of the non-magnetic electrically conductive material, as shown in FIG. 5. At this time, the region of the deice member 11 of the GMR device 20 connected to the magnetic electrically conductive member 21 is lowered in the rate of change in resistance to reduce the amount of change in the detected signal voltage. Therefore, the region of the device member 11 of the GMR device 20 connected to the magnetic electrically conductive member 21 ceases to operate as a magnetically sensitive portion and functions only as a route for magnetic conduction. Thus, in the present GMR device 20, the area of the device member 11 connected to the magnetic electrically conductive member 21 operates as a route for magnetic conduction, thus enabling the magnetic flux from the magnetic medium to enter the magnetically sensitive portion efficiently.

The result is that, if a giant magnetoresistance effect type magnetic head (GMR head) is used, the magnetic flux from the magnetic recording medium may be introduced efficiently to the magnetically sensitive portion, thus achieving a larger playback output.

Figure 6:
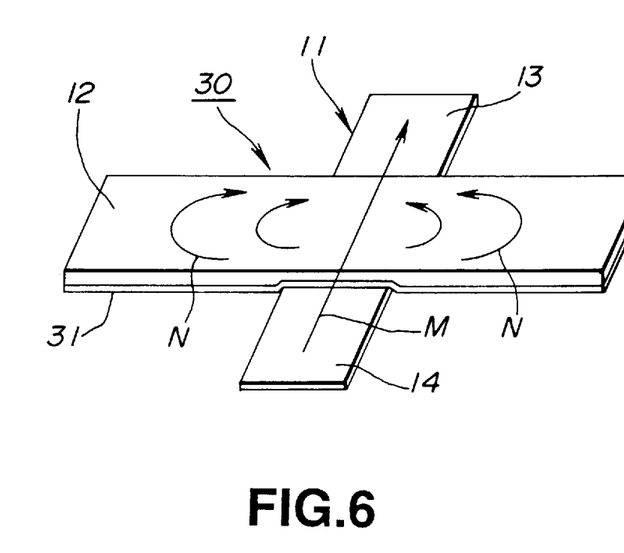
FIG. 6 is a perspective view showing another modification of the GMR device shown in FIG. 3.

In the second embodiment of the GMR device 10, an insulating film 31 substantially coextensive as the electrically conductive member 12 may be provided between the device member 11 and the electrically conductive member 12 to provide a GMR device 30, as shown in FIG. 6. Since the sense current flows through the insulating film 31 and the electrically conductive member 12, the device member 11 displays a heat radiating effect. Moreover, the antiferromagnetic coupling between the magnetic layers disposed in the device member 11 of the GMR device 10 may be prevented from being destroyed.

Figure 7:
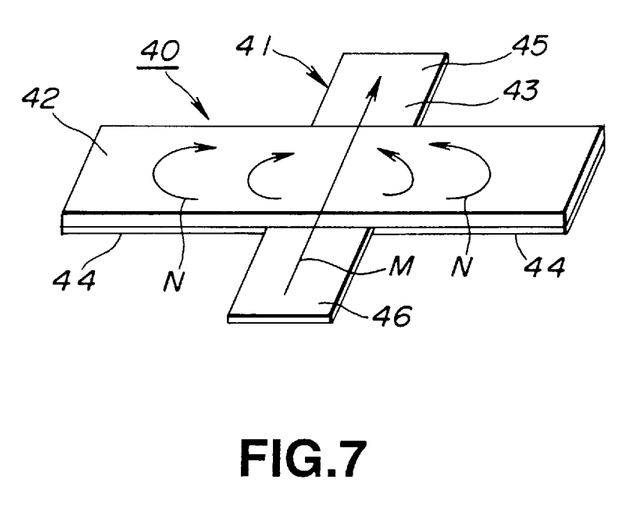
FIG. 7 is a perspective view showing a GMR device according to a third embodiment of the present invention.

A GMR device 40 in a third embodiment of a of the present invention includes a substantially cross-shaped device member 41 and an electrically conducive member 42 of a transverse rectangular shape formed on the device member 41, as shown in FIG. 7. The device member 41 and the electrically conducive member 42 are etched to a pre-set shape.

The device member 41 is made up of at least two or more layers of soft magnetic layers and non-magnetic electrically conductive layers. The mid region in the longitudinal direction of the longitudinally elongated current routing portion 43 of the GMR device 40 is designed as a widened portion 44. The sense current flows in the longitudinal direction of the current routing portion 43 by the forward and rear end electrodes connected to forward end portion 45 and a rear end portion 46, respectively.

The widened portion 44 is a transversely extended in rectangular shape as one with and at right angles to the current routing portion 43. The widened portion 44 has a thickness substantially equal to the thickness of the current routing portion 43 and a width larger than the width of the current routing portion 43. Also, the widened portion 44 has a length smaller than the length of the current routing portion 43.

The electrically conductive member 42 is electrically connected to a region in the widened portion 44 of the device member 41 and is substantially coextensive as the widened portion 44 of the device member 41.

The electrically conductive member 42 has a thickness approximately ten times that of the device member 41. The electrically conductive member 42 has a thickness substantially equal to the thickness of the rear end electrode connected to the rear end 46 of the device member 41 and a width substantially equal to the width of the widened portion 44 of the device member 41. Also, the electrically conductive member 42 has a length smaller than the length of the current routing portion 42 of the device member 41.

In the above-described third embodiment of the GMR device 40, the sense current flows in a direction shown by arow M in FIG. 7 from the rear end 46 towards the forward end 45 of the current routing portion 43 of the device member 41 by the forward end electrode and the rear end electrode. The sense current also flows in the widened portion 44 and in the electrically conductive member 42 of the device member 41 in a direction indicated by arrow N in FIG. 7. Since the sense current flowing in the widened portion 44 connected to the electrically conductive member 42 of the device member 41 is lowered at this time in current density, the current magnetic field (self-field) produced by the sense current is diminished, so that neighboring spins of the magnetic layers disposed in the widened portion 44 of the device member 41 of the GMR device 40 can be aligned in a parallel relation only with difficulties. Thus, with the present GMR device 40, the spins of the magnetic layers disposed in the widened portion 44 connected to the electrically conductive member 42 of the device member 41 are maintained in the antiferromagnetically spin disposition.

On the other hand, if the widened portion 44 of the device member 41 is increased sufficiently in width, difficulties encountered in achieving substantially parallel alignment of the neighboring spins of the magnetic layers disposed at both ends of the widened portion 44 are accentuated, so that the spins of the magnetic layers disposed at both ends of the widened portion 44 are maintained in the antiferromagnetic spin condition.

With the present GMR device 40, the magnetic layers disposed in the widened portion 44 connected to the current routing portion 42 in the device member 41 are ferromagnetically coupled in the in-plane relation with the respective magnetic layers disposed in the forward end 45 and the rear end 46 of the device member 41. Thus, with the present GMR device 40, the spins of the magnetic layers disposed at the forward end 45 and the rear end 46 of the current routing portion 42 are maintained in the antiferromagnetic spin condition under the effect of the spin of each magnetic layer which are disposed in the widened portion 44 of the device member 41 connected to the current routing portion 42 and hence maintained in the antiferromagnetic spin condition.

With the present GMR device 40, if the forward electrode and the rear electrode are connected to the forward and 45 and the rear end 46 of the device member 41, respectively, the sense current flowing in an area of connection to the electrodes of the forward end 45 and the rear end 46 of the current routing portion 42 is lowered in density. Thus, in an area of connection to the electrodes of the forward end 45 and the rear end 46 of the current routing portion 42, the current-magnetic field caused by the sense current is diminished. Thus, with the present GMR device 40, the spin of each magnetic layer disposed in the area of connection to the electrodes of the forward end 45 and the rear end 46 of the device member 41 is maintained in the antiferromagnetic spin condition.

Thus, in the above-described third embodiment of the GMR device 40, since the spin of each magnetic layer disposed in the current routing portion 42 is maintained in the antiferromagnetic spin condition, the antiferromagnetic coupling between the magnetic layers may be prevented from being destroyed.

Also, with the present GMR device 40, the electrically conductive member 42 lowers the density of the sense current flowing in the device member 41 to prevent the heat from being evolved by the sense current. Moreover, since the sense current flows in the electrically conductive member 42, the device member 41 produces the heat radiating effect, so that the antiferromagnetic coupling between the magnetic layers in the device member 41 may be prevented from being destroyed.

Thus, with the present GMR device 1, the rate of change in resistance dependent on the sense current density may be prevented from being lowered in the magnetically sensitive portion defined between the forward portion 45 and the rear portion 46 in the device member 41 thus achieving high magnetic field sensitivity.

Moreover, if, with the present GMR device 40, the magnetically sensitive portion of the device member 41 is short in length and is disposed in the vicinity of the forward end 45 and the rear end 46 where the sense current is low in current density, the rate of change in resistance dependent on the sense current density may be prevented from being lowered in the region of the magnetically sensitive portion, thus realizing a high magnetic field density even in a region of high sense current density.

Figure 8:
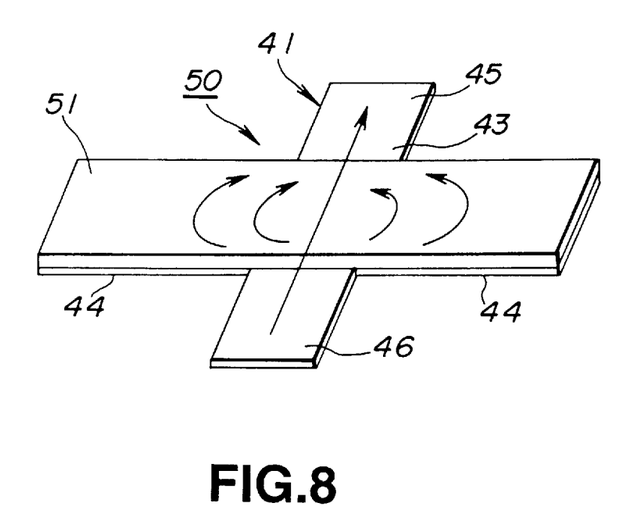
FIG. 8 is a perspective view showing a modification of the GMR device shown in FIG. 7.

In a GMR device 50 of a third embodiment of the present invention, the electrically conductive member 42 may be formed of a magnetic electrically conductive material, such as a soft magnetic electrically conductive material, in place of the non-magnetic electrically conductive material, as shown in FIG. 8. At this time, the region of the device member 41 of the GMR device 50 connected to a magnetic electrically conductive member 51 is lowered in the rate of change in resistance to reduce the amount of change in the detected signal voltage. Therefore, the region of the device member 41 of the GMR device 50 connected to the magnetic electrically conductive member 51 ceases to operate as a magnetically sensitive portion and functions only as a route for magnetic conduction. Thus, in the present GMR device 50, the area of the device member 51 connected to the magnetic electrically conductive member 51 operates as a magnetically conductive portion, thus enabling the magnetic flux from the magnetic medium to enter the magnetically sensitive portion efficiently.

The result is that, if the GMR device 50 is provided in a giant magnetoresistance effect type magnetic head (GMR head), the magnetic flux from the magnetic recording medium may be introduced efficiently to the magnetically sensitive portion, thus achieving a larger playback output.

Figure 9:
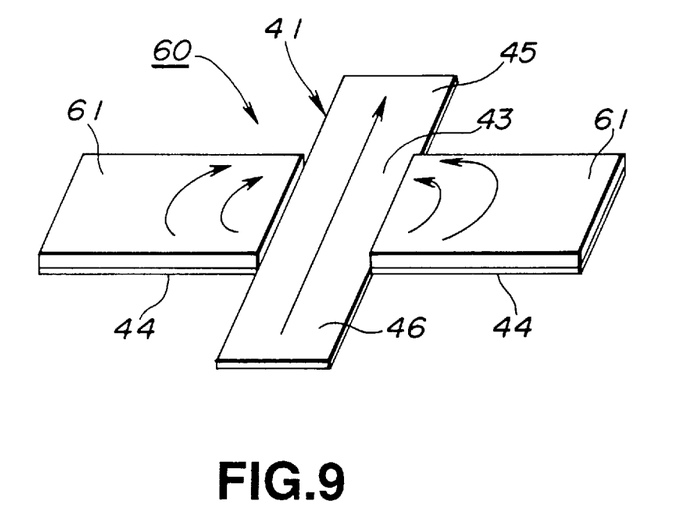
FIG. 9 is a perspective view showing another modification of the GMR device shown in FIG. 7.

Also, in the third embodiment of the GMR device 50, a pair of electrically conductive members 61, 61 may be provided in register with the widened portions 44 excluding the current routing portion 43 in the device member 41, as shown in FIG. 9. The electrically conductive members 61, 61 of the GMR device 60 lower the density of the sense current flowing in the device member 41 for preventing the heat from being evolved due to the sense current. Also, since the sense current flows in the electrically conductive members 61, 61 of the GMR device 60, the device member 41 produces the heat radiating effect. This prevents the antiferromagnetic coupling between the magnetic layers of the device member 41 of the GMR device 60 from being destroyed.

Figure 10:
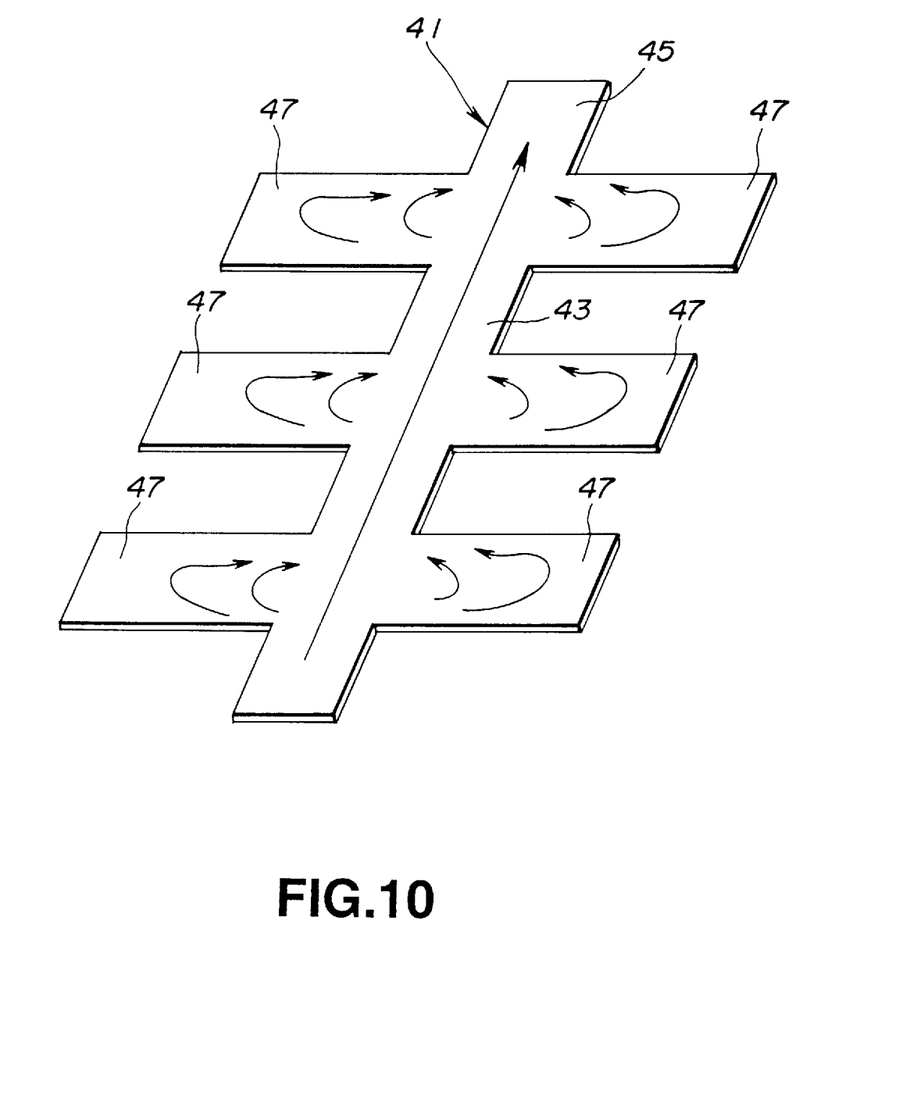
FIG. 10 is a perspective view showing yet another modification of the GMR device shown in FIG. 7.

In the third embodiment of the GMR device 40, a portion of the longitudinally mid area of the current routing portion 41 is formed as a widened portion 44. However, a plurality of widened portions 47 may also be provided in the current routing portion 41, depending on the length of the magnetically sensitive portion, as shown in FIG. 10.

Figure 11:
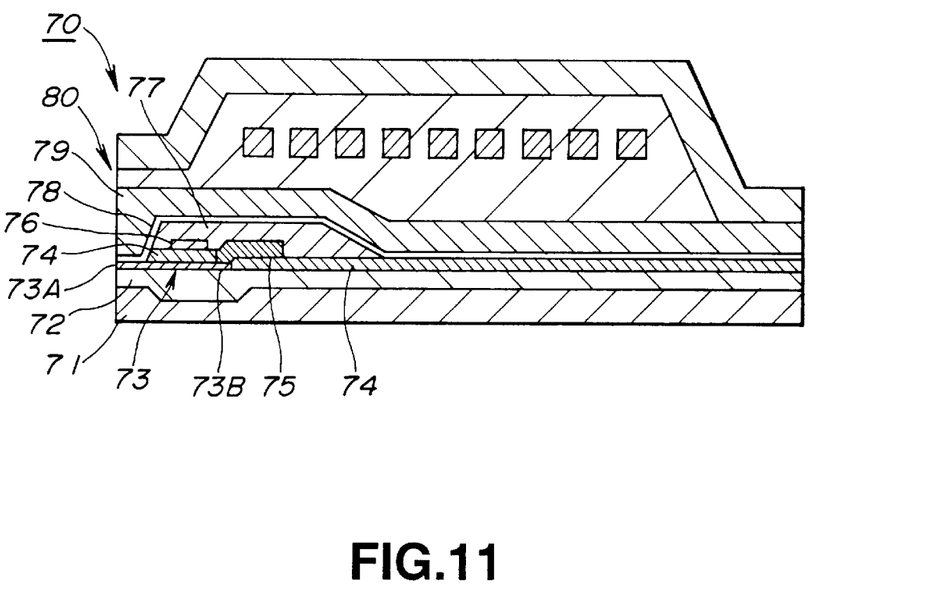
FIG. 11 is a cross-sectional view showing essential portions of a GMR head fitted with one of the GMR devices.

Referring to FIG. 11, a typical method for producing a GMR head 70 having the above-described embodiment of the GMR device is explained. For producing the GMR head 70, a lower magnetic layer 71 is first layered on a non-magnetic substrate. A lower insulating layer 72 is then deposited by sputtering on the lower magnetic layer 71. On the lower insulating layer 72, a GMR film is formed using a sputtering device, a vacuum deposition device, an ion beam sputtering device or a molecular beam sputtering device. A photoresist is coated on the surface of the GMR film and a resist mask of a pre-set shape is formed by a photolithographic technique. The GMR film is ion-milled to a pre-set planar shape in meeting with a pattern formed on the resist mask, using an etching device, to form a GMR device 73. If it is desired to produce the GMR device according to the first or third embodiment, it is formed with the widened portion.

On the lower insulating layer 72 and on the GMR device 73, an intermediate insulating layer 74 of, for example, $SiO_2$, is layered to a thickness of 0.3 μm by sputtering. Then, a connection hole exposing a rear end 73B of the GMR device 73 is formed in the intermediate insulating layer 74 by etching using a reactive ion etching device. The GMR device 73 can retain its sufficient thickness even if a connection hole is formed in the intermediate insulating layer 74 under low etching rate conditions.

If it is desired to produce the GMR device according to the second or third embodiment, a connection opening is formed in the intermediate insulating layer 74 for electrically connecting an electrically conductive member and a magnetic electrically conductive member with the GMR device 73. A non-magnetic electrically conductive material, such as Cu, or a soft magnetic electrically conductive material, such as permalloy, is layered to a thickness of 0.2 μm for electrical connection with the GMR device 73 via this connection opening. The electrically conductive material is etched to a pre-set shape.

If the GMR device of the third embodiment is desired to be produced, this electrically conductive material is etched to a pre-set shape to form a rear end electrode 75, an electrically conductive portion and a magnetic electrically conductive portion.

On the intermediate insulating layer 74 is layered an electrically conductive material, such as Cu, by sputtering to a thickness of 0.3 μm. The electrically conductive material is etched to a pre-set shape to form a bias electrode 76. On the rear end electrode 75 and on the bias conductor 76 is then layered an upper insulating layer 77 of, for example, $SiO_2$, having a high etching rate, to a thickness of the order of 0.3 μm.

Then, on the surface of the forward end of the upper insulating layer 77 is coated a photoresist which is hard-cured at a temperature of not lower than 150° C. to form a tapered resist mask. The forward end side of the upper insulating layer 77 is etched to a tapered shape using a reactive ion etching device in meeting with a pattern formed in the resist mask for forming a connection hole exposing the forward end 73A of the GMR device 73.

On the upper insulating layer 77 and on the intermediate insulating layer 74 is then layered an electrically conductive material, such as Ti, by sputtering. The electrically conductive material is then etched to a pre-set shape to form a forward end electrode 78. An upper magnetic layer 79 is then layered on the forward end electrode 78 and, on this upper magnetic layer 79, an inductive head for recording 80 and a protective layer are layered sequentially. The resulting assembly is sliced to a pre-set shape to complete the GMR head 70.

What is claimed is:

1. A longitudinal type magnetoresistance effect device in which the sense current flows in a direction perpendicular to a surface of a magnetic recording medium, wherein the improvement resides in that at least two or more layers of soft magnetic layers and non-magnetic electrically conductive layers are layered together in multiple layers; and in that the device comprises a forward and portion facing the magnetic recording medium, said forward and portion being narrower in width than a playback track width, a rear end portion disposed opposite to the forward end portion and a magnetically sensitive portion disposed between said forward end portion and the rear end portion, said magnetically sensitive portion having an area broader than said playback track width.

2. The longitudinal type magnetoresistance effect device as claimed in claim 1 wherein the length of said magnetically sensitive portion is larger than 0 μm and not larger than 2 μm.

3. The longitudinal type magnetoresistance effect device as claimed in claim 1 wherein there are a plurality of the broader areas.

4. A longitudinal type magnetoresistance effect device in which the sense current flows in a direction perpendicular to a surface of a magnetic recording medium, wherein the improvement resides in that at least two or more layers of soft magnetic layers and non-magnetic electrically conductive layers are layered together in multiple layers; and in that the device comprises a device member having a forward end portion facing the magnetic recording medium, said forward end portion being narrower in width than a playback track width, a rear end portion disposed opposite to the forward end portion and a magnetically sensitive portion disposed between said forward end portion and the rear end portion, said magnetically sensitive portion operating as a current route for the sense current, and an electrically conductive member partially overlapped with the magnetically sensitive portion of said device member and having its longitudinal direction at right angles with the device member, said magnetically sensitive portion having a length larger than the playback track width.

5. The longitudinal type magnetoresistance effect device as claimed in claim 4 wherein the length of said magnetically sensitive portion is larger than 0 $\mu$m and not larger than 2 $\mu$m.

6. The longitudinal type magnetoresistance effect device as claimed in claim 4 wherein there are a plurality of magnetically sensitive portions having a length larger than the playback track width.

7. The longitudinal type magnetoresistance effect device as claimed in claim 4 wherein an insulating film is interposed at least at a position of overlapping of said device member and the electrically conductive member.

8. The longitudinal type magnetoresistance effect device as claimed in claim 4 wherein the thickness of said electrically conductive member is larger than that of said device member.

9. The longitudinal type magnetoresistance effect device as claimed in claim 4 wherein said magnetically sensitive portion has an area broader than the playback track width.

* * * * *